Figure 16:
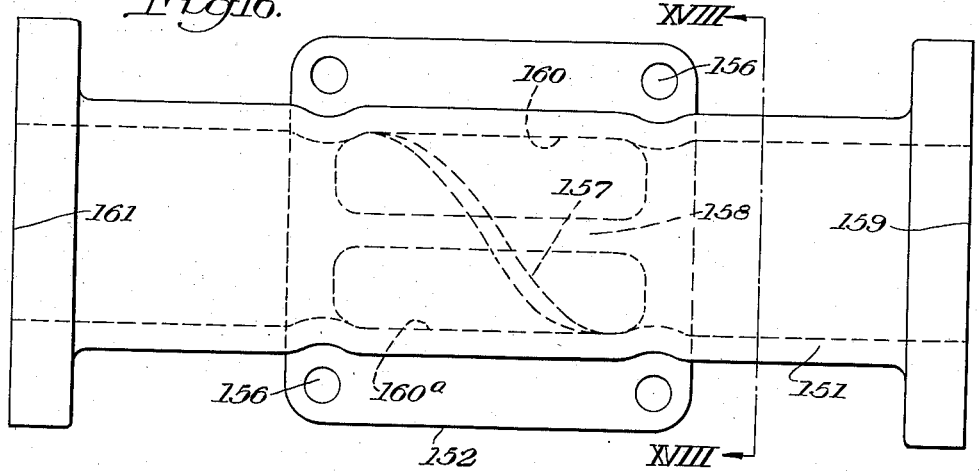

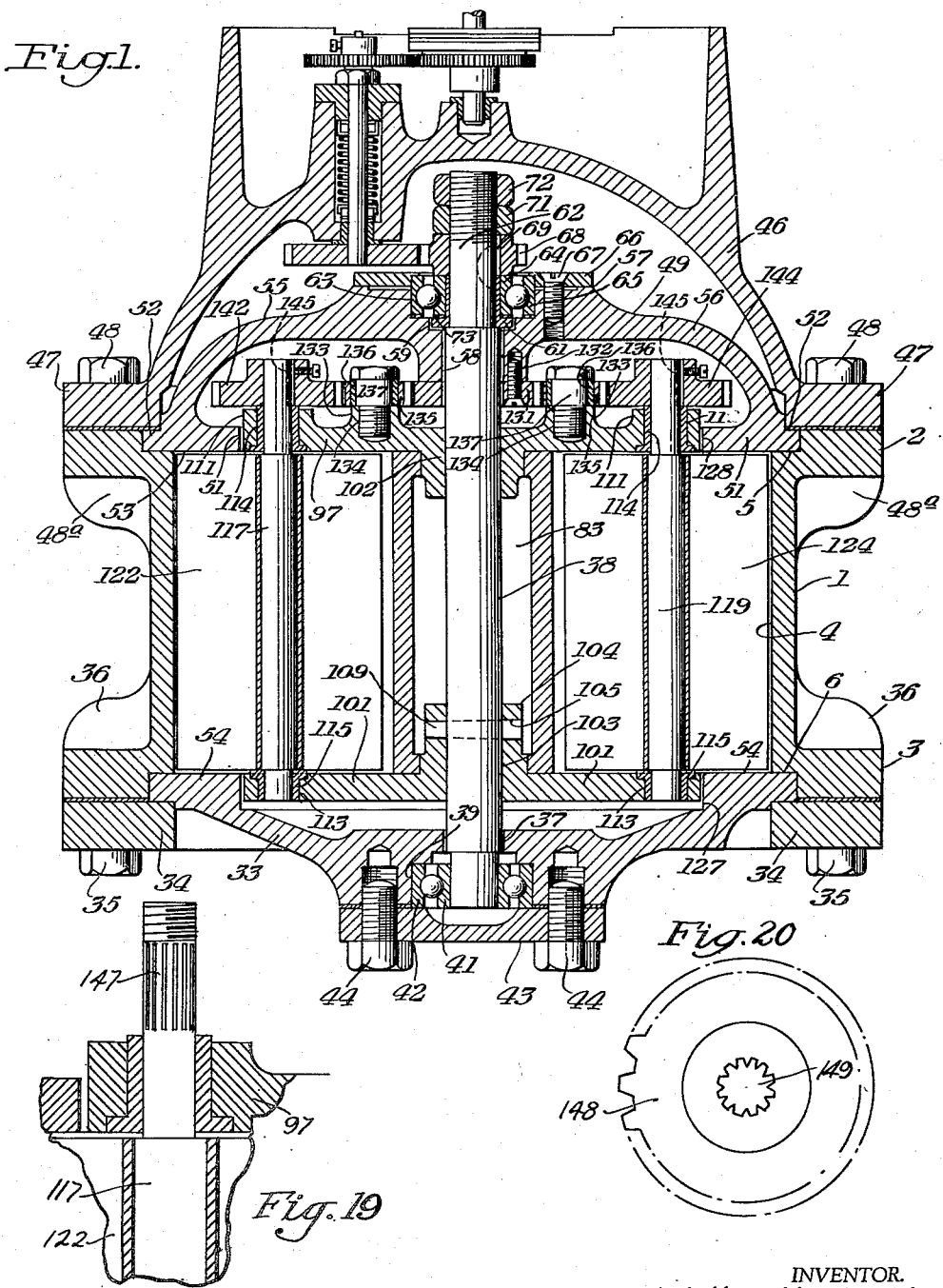

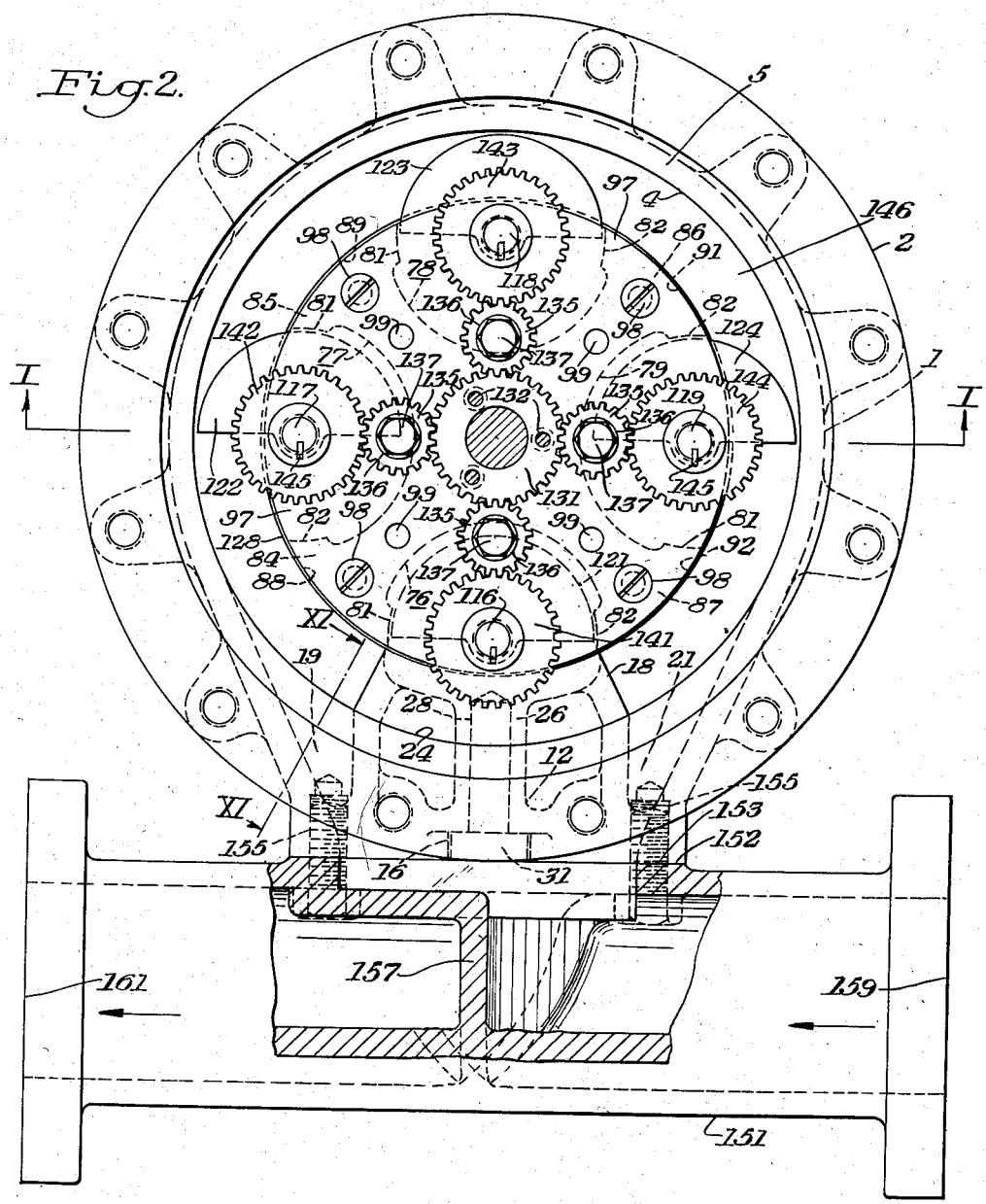

Feb. 24, 1942. W. H. MARSH 2,274,206
ROTARY FLUID METER
Filed Dec. 13, 1937 6 Sheets-Sheet 3
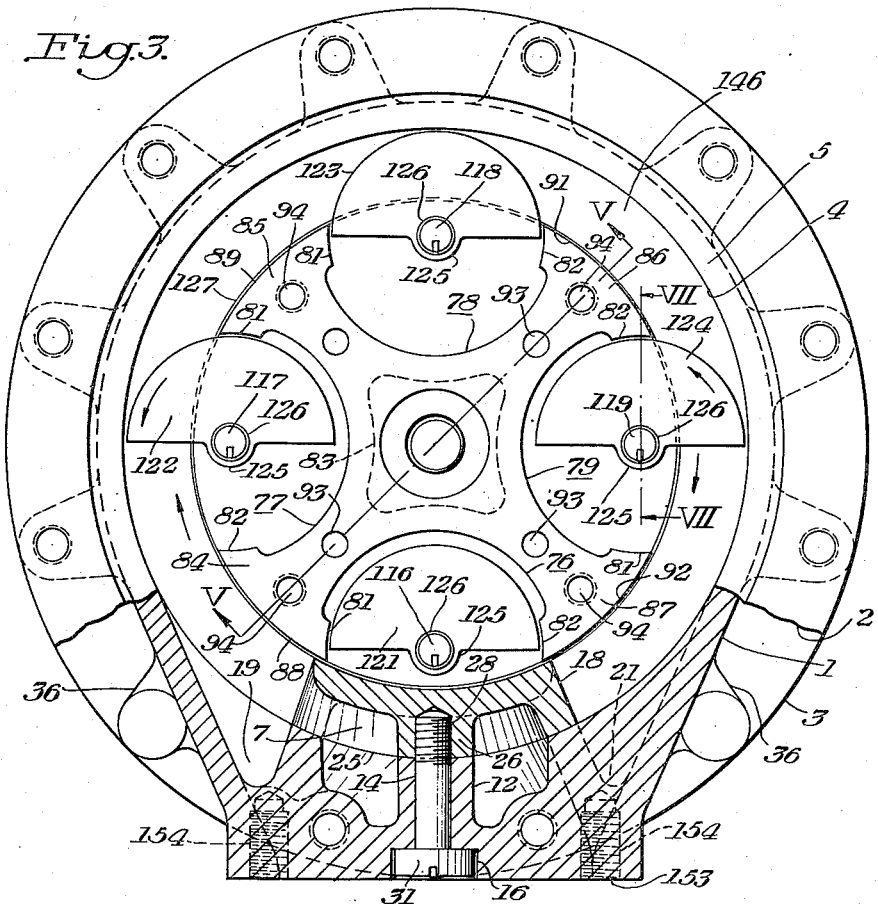
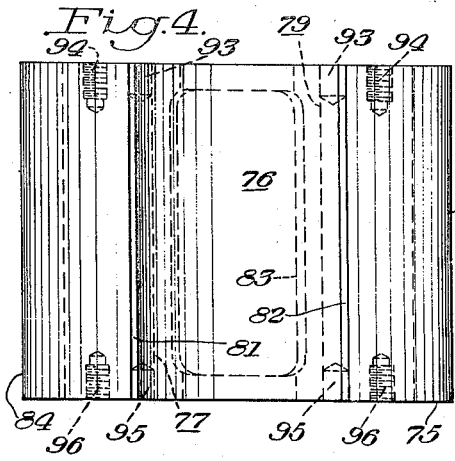
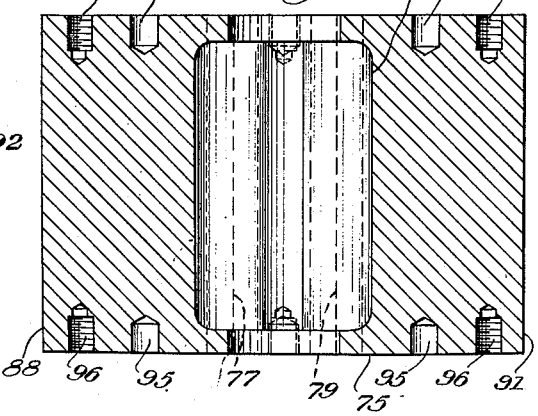
INVENTOR.
Walter H. Marsh.
BY Lewis D. Konigsford
ATTORNEY.

Feb. 24, 1942. W. H. MARSH 2,274,206
ROTARY FLUID METER
Filed Dec. 13, 1937 6 Sheets-Sheet 4
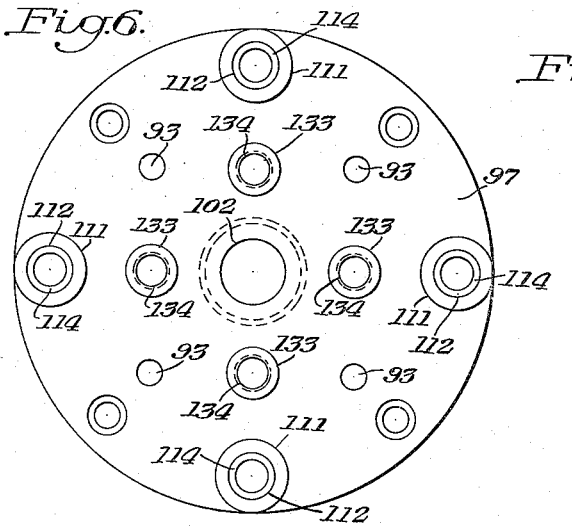
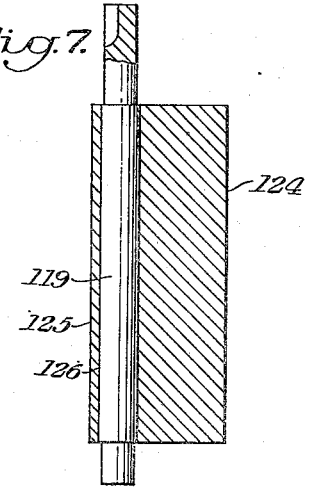
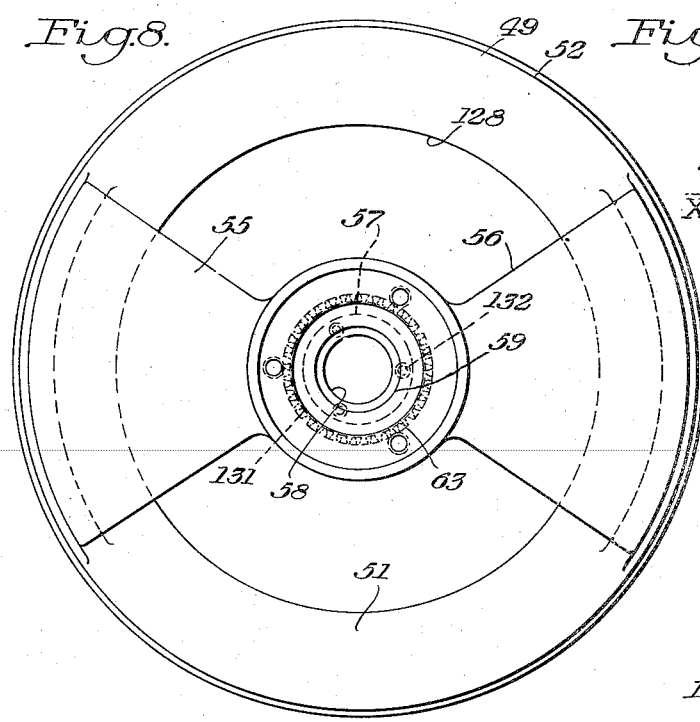
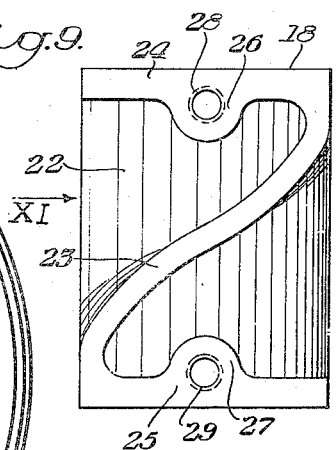
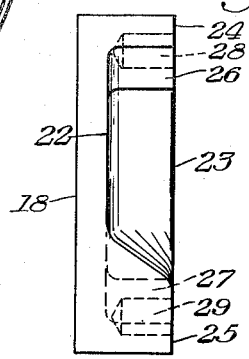
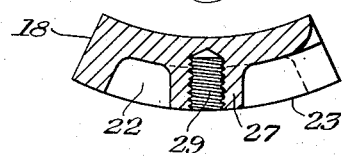
INVENTOR.
Walter H. Marsh.
Lewis D. Konigsford
ATTORNEY.

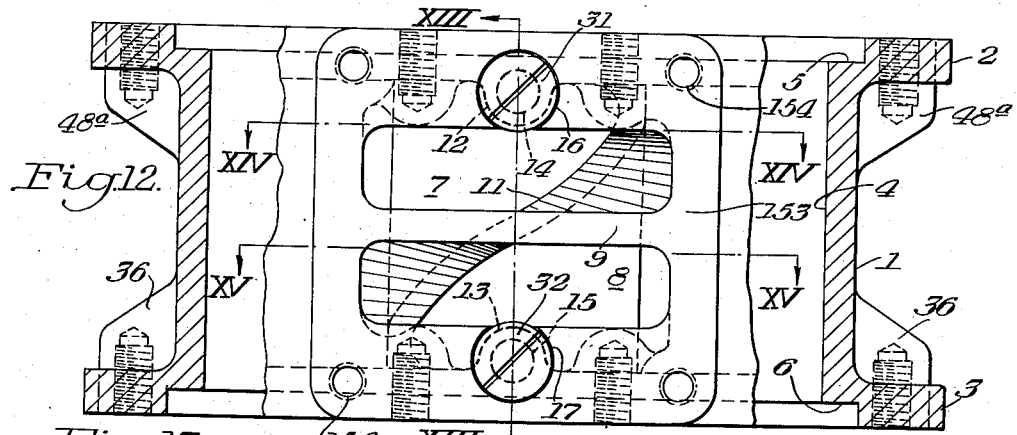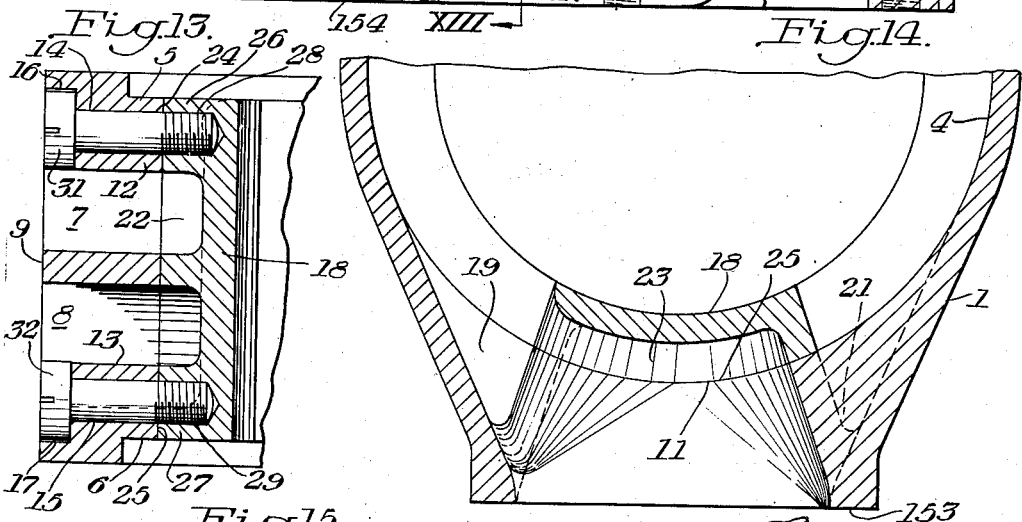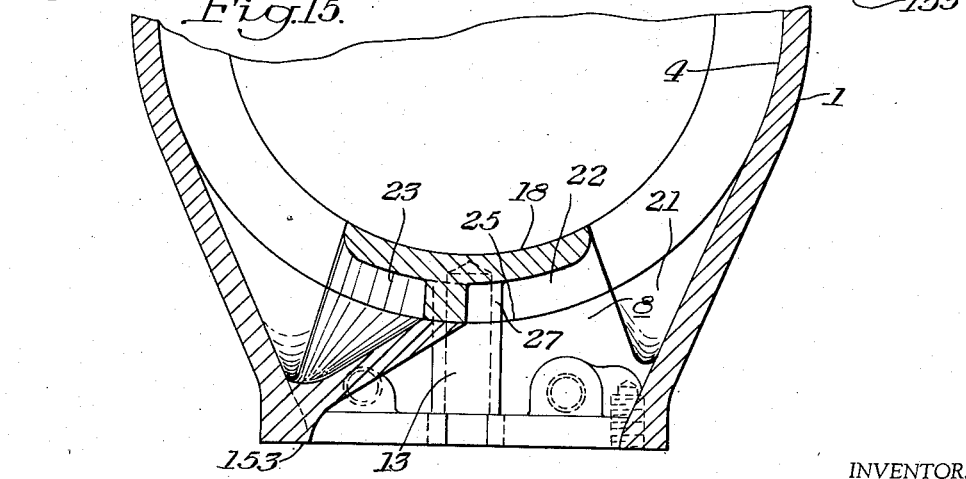

INVENTOR.
Walter H. Marsh
BY
ATTORNEY.

Patented Feb. 24, 1942

2,274,206

UNITED STATES PATENT OFFICE 2,274,206

ROTARY FLUID METER

Walter H. Marsh, Crafton, Pa., assignor to Pittsburgh Equitable Meter Company, Pittsburgh, Pa., a corporation of Pennsylvania Application December 13, 1937, Serial No. 179,394

11 Claims. (Cl. 73—261)

The present invention relates to improvements in rotary fluid meters adapted to measure fluids of various kinds such as water, gasoline, petroleum, natural gas, manufactured gas, air and the like.

It is an object of the present invention to provide a rotary meter of the positive displacement type which is substantially balanced so that it may be used with its axis of rotation in horizontal or vertical positions, or in any inclined position.

A further object of the invention is the provision of a rotary meter of the positive displacement type in which all parts have rotary motion.

A further object is the provision of a rotary meter which eliminates the use of cams or other devices for producing a non-uniform motion.

Still another object is the provision of a rotary meter which is self-scavenging, that is in which accumulation of foreign matter in the meter is prevented from interfering with the operation thereof.

A further object is the provision of a rotary meter which may be operated at high speed so as to have a high capacity and which has a low pressure absorption.

According to the present invention a rotary meter is provided having a casing with the rotor therein providing a measuring chamber therebetween, the inlet and outlet of the measuring chamber being separated by a division plate which co-operates with the rotor surface to prevent leakage of fluid. The rotor contains a plurality of pockets or recesses, preferably of cylindrical form and the division plate is of such arcuate extent as to span and overlap the recesses or pockets, thereby sealing off the inlet and the outlet of the meter and preventing hydraulic lock. Vanes, preferably of semi-cylindrical form, are journalled in said pockets and rotate on their own axes with respect to the rotor, said vanes extending into the measuring chamber, and as the flat portion of the vanes faces the division plate, the vanes can pass the division plate as they are carried around during rotation of the rotor. The preferred form or rotary vane is the form of a semi-cylinder of such diameter that its cylindrical surface in extended position provides a running clearance with the cylindrical wall of the measuring chamber, and also provides a running clearance with the wall of the cylindrical recess of the rotor. The length of the vane is such that it provides a similar running clearance with the bottom and top of the measuring chamber. In this manner, by providing clearances between all relatively moving parts, frictional resistance to turning is eliminated and wear on the parts also is eliminated.

In the preferred embodiment the vanes are rotated by a planetary gear construction involving a central fixed or sun gear, a rotating or planet gear secured to the vane to rotate therewith, and an idler gear in mesh with both of said gears. However, any other mechanism for rotating the vanes may be employed. In the specific embodiment shown in which there is one entrance and one exit, the gear ratio of the sun and planet gears is one to one, that is, each vane makes one complete rotation for each complete rotation of the rotor. Because the meter is dynamically balanced it may be operated with its axis horizontal, vertical or in any inclined position, and when the meter operation is stopped it will be in balance so that there will be no tendency to rotate in either direction and thus produce an inaccurate tabulation of the register. Two or more vanes may be employed.

Figure 17:
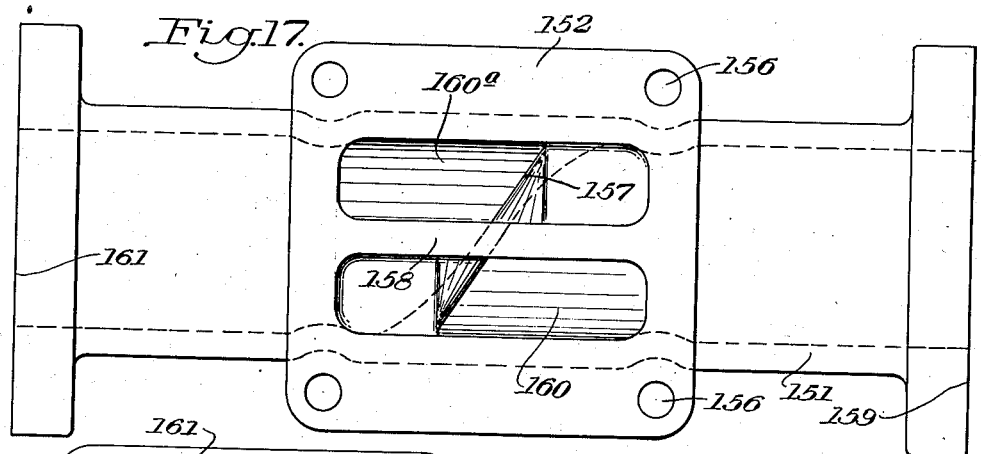
Figure 18:
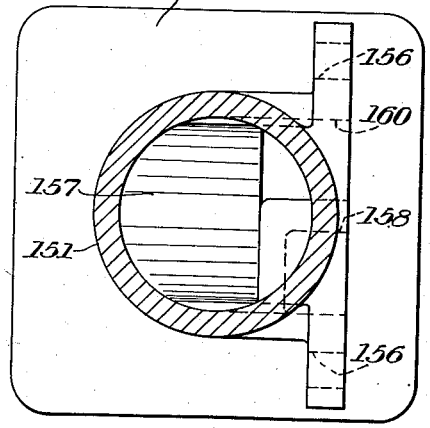

The invention will be described in further detail in the following specification taken in connection with the accompanying drawings and wherein:

Figure 1 is a vertical section through the meter taken on line I—I of Figure 2,

Figure 2 is a plan view of the meter as shown in Figure 1 with the outer cover and bearing plate removed, and certain parts being in section, Figure 3 is a plan view of the meter with the outer cover, bearing plate and rotor cover removed, certain parts being in horizontal section, Figure 4 is a side view of the rotor, Figure 5 is a section taken through the rotor on line V—V of Figure 3, Figure 6 is a plan view of the top rotor cover, Figure 7 is a section through a vane taken on the line VII—VII of Figure 3, Figure 8 is a plan view of the top bearing plate, Figure 9 is an elevation of the division plate as viewed from the bottom in Figure 3, Figure 10 is a horizontal section through the division plate taken on line X—X of Figure 9, Figure 11 is a side elevation of the division plate looking in the direction of the arrow XI of Figure 9, Figure 12 is a bottom view of the rotor case as seen in Figure 3, certain parts being in section, Figure 13 is a vertical section through the rotor case and division plate taken on line XIII—XIII of Figure 12, Figure 14 is a horizontal section taken through the meter case and division plate on line XIV—XIV of Figure 12, Figure 15 is a horizontal section taken through the meter case and the division plate on line XV—XV of Figure 12, Figure 16 is a bottom view of the pipe connection for the meter, Figure 17 is a plan view of the pipe connection for the meter, Figure 18 is a sectional view taken on line XVIII—XVIII of Figure 16, and Figure 19 is a fragmentary sectional view showing a modification of the vane shaft, and Figure 20 is a plan view of a modified gear.

In the accompanying drawings, in Figure 2, I have shown a preferred embodiment of my invention operating on a horizontal axis and in Figure 1 the meter is arranged on a vertical axis. In the following description the top and bottom of the meter will be referred to as viewed in Figure 1, but it will be understood that the terms "top" and "bottom" are only relative, as the meter may be operated on a horizontal or inclined axis.

Referring to the drawings, the meter comprises an outer casing 1 having flanges 2 and 3 at the ends thereof and a cylindrical bore 4 formed therein terminating in circumferential shoulders 5 and 6. The casing has crossed entrance and exit ports 7 and 8 (Figure 12) extending through the casing wall 1 into the bore 4 which are separated by the horizontal partition 9 merging into the ogee shaped inclined web 11.

The entrance portion of the casing has lugs 12 and 13 (Figures 12 and 13) with bores 14 and 15 therein surrounded by countersinking bores 16 and 17. A division plate 18 is located in the chamber 4 between the entrance and the outlet openings 19 and 21 of the meter chamber, which connect with entrance and exit ports 7 and 8 respectively. The division plate is recessed at 22 (Figure 9) and has a diagonal extending raised rib 23 substantially in the form of an ogee merging with the horizontal top and bottom ribs 24 and 25 respectively. Lugs 26 and 27 are provided in the recessed face of the division plate which are bored and threaded as indicated at 28 and 29. The division plate 18 is secured in place by any suitable means, such as cap screws 31 and 32 (Figures 12 and 13) extending through the bores 14 and 15 in the casing and threaded into the threaded bores 28 and 29 in the division plate, the ogee rib 23 of the division plate abutting the ogee edge 11 of the web 9 in the casing.

The bottom plate 33 (Figure 1) of the meter bears on lower shoulder 6 and is held in position by a retaining ring 34 held in place by bolts 35 passing through the ring and lower flange 3 and threaded into the lugs 36 on the inner side thereof. The bottom cover is bored at 37 to allow the central shaft 38 to pass therethrough and is counterbored at 39 to receive the inner and outer races 41 and 42 respectively of the lower radial ball bearing assembly, the inner race 41 being secured to the shaft 38 in any suitable manner, as by a pressed fit. The lower ball bearing assembly is protected from the exterior by cover plate 43 secured to the bottom by bolts 44 or in any other suitable manner, and it will be observed that the cover plate overlaps the outer race 42 of the ball bearing assembly to clamp the assembly in position against the top of counterbore 39. If desired, the lower cover 33 may be made integral with the casing 1.

At the upper end of the meter casing 1 is an outer cover 46 having a flange 47 and is secured in position by bolts 48 passing through the flange 47 into flange 2 and threaded into lugs 48a of the casing. A bearing plate 49 (Figures 1 and 8) has an integral flange 51 with a shoulder 52 thereon, the lower face 53 of the flange 51 resting on shoulder 5 and the shoulder 52 being engaged by the inner edge of flange 47 of outside cover 46 whereby the bearing plate is clamped in position. The under face 53 of the flange 51 forms the top of the measuring chamber, and the face 54 of the bottom plate 33 forms the bottom of the measuring chamber. The upper bearing plate 49 has two webs 55 and 56 forming a central hub 57 which is bored at 58 to allow the shaft 38 to pass therethrough and is counterbored at 59 to receive the flange of a bushing 61 secured to the reduced end 62 of the shaft 38 in any suitable manner, as by a pressed fit. The hub 57 is further counterbored at 63 to receive the inner and outer races 64 and 65 respectively of the upper ball bearing assembly, the inner race being secured on bushing 61 as by a pressed fit so as to rotate therewith. The annular plate 66 is secured to the bearing plate 49 by screws 67 or by other suitable means and has a flange overhanging the outer race to keep the ball bearing assembly in position. A pinion 68 is located on the reduced end 62 of the central shaft and is secured against rotation relative thereto by a key 69, the bushing 61 and pinion 68 being held in assembled relation by the locknuts 71 and 72 threaded into the shaft and which also maintain the ball bearing assembly against the bottom flange of the bushing 61. The meter register (not shown) is secured to the top cover 46 in any suitable manner and is driven by pinion 68 and a train of gears in known manner. If desired, shims 73 may be inserted between the bottom of recess 63 and the ball bearing assembly.

The rotor 75 (Figures 3, 4 and 5) is substantially cylindrical and has recess 76, 77, 78 and 79 formed in its periphery, the faces 81 and 82 of each recess being machined on a radius. The rotor is cored out at its central portion as indicated at 83 to reduce the weight of the rotor. The rotor thus comprises four partitions 84, 85, 86 and 87 having cylindrical outer faces 88, 89, 91 and 92, and these partitions are each bored at both ends as indicated at 93, 94 and 95, 96, the bores 94 and 96 being threaded. A top cover 97, (Figures 1 and 6) for the rotor is secured thereto by screws 98 (Figure 2) passing through the threaded holes 94 in the rotor, and by dowels 99 passing through the rotor cover into holes 93 in the rotor to accurately position the cover. For the purpose of reducing the cost of manufacture, the top and bottom covers of the rotor may be formed identical, if desired, and the bottom rotor cover 101 (Figure 1) may be secured to the top cover in exactly the same manner as the top cover. The top and bottom rotor covers have aligned openings 102 and 103 therein respectively through which extends the central shaft 38 of the rotor. The hub 104 of the bottom cover has a hole 105 bored therethrough in alignment with a hole in the shaft 38, and the bottom cover and shaft are keyed together by a pin 109 passing through the aligned holes in the hub and shaft. The rotor thus is keyed to the central shaft 38 to rotate therewith. In assembling the rotor, the bottom is first keyed to the shaft and then is secured to the rotor.

The top rotor cover has bosses 111, and aligned holes 112 and 113 are formed in the bosses and in the bottom cover, respectively. These holes have flanged bushings 114 and 115 therein respectively, and vane shafts 116, 117, 118 and 119 are journalled in the aligned bushings and have secured thereon in any suitable manner, as for example by a pressed fit, the vanes 121, 122, 123 and 124. As all of these vanes are of identical construction, only one vane 124 will be described in detail. Referring to Figures 3 and 7, the vane 124 comprises a semi-cylindrical body member having a central hub 125 which is bored at 126 to receive the shaft 119. If desired, the vane may be made hollow to reduce its weight, as by boring a plurality of axial holes therein, and may be made of an aluminum alloy, synthetic resin, or other light material. Shafts, 116, 117 and 118 are identical with shaft 119.

By referring to Figure 3 it will be seen that the radii of the vanes 121, 122, 123 and 124 are slightly less than the radius of the recess faces 81 and 82 in the periphery of the rotor so that a slight running clearance on the order of two thousandths to four thousandths of an inch are provided between the cylindrical face of the vanes and the recess faces, whereby friction is substantially eliminated. The recesses 76, 77, 78 and 79 are set back sufficiently so as to prevent accumulation of foreign matter on the walls thereof from interfering with the movement of the vanes. Also the diameter of vanes 121, 122, 123 and 124 and their position with reference to the central shaft is selected so that a running clearance of several thousandths of an inch is provided between the cylindrical wall of the rotor vanes and the cylindrical wall 4 of the casing which further eliminates friction. The bottom casing cover 33 has a cylindrical bore 127 of such diameter that it provides a clearance of like order with the periphery of the bottom rotor cover 101 and the diameter of the inner surface 128 of the flange 51 of the top bearing plate 49 is of such diameter that it provides a similar clearance with the periphery of the top rotor cover 97. The bottom ends of the rotary vanes 121, 122, 123 and 124 also have a similar clearance with the bottom surface 54 of the measuring chamber and bottom rotor cover 101, and the top ends of the vanes have a similar clearance with the top surface 53 of the measuring chamber and with the top rotor cover 97. This clearance may be maintained by adjustment of top bearing 64, 65 by means of shims 73. The clearance of the vanes with the top and bottom rotor covers may be maintained by having the bushings 115 extended sufficiently to bear on the bottom of the vane. The diameter of the rotor 75 and thickness of division plate 18 are such that the faces 88, 89, 91 and 92 provide a similar running clearance with the inner arcuate edge of the division plate 18.

A stationary or sun gear 131 (Figures 1 and 2) is secured to the central hub 57 of the bearing plate 49 by means of screws 132 or in any other suitable manner. The top rotor plate 97 has a plurality of lugs 133 (Figure 6) which are bored and threaded at 134 and idler pinions 135 having bushings 136 pressed therein are held on these lugs by cap screws 137 in mesh with gear 131. The upper reduced ends of the vane shafts 116, 117, 118 and 119 carry planet gears 141, 142, 143 and 144 keyed thereto by a key 145 and which mesh with the idler gears 135. As seen in Figure 2, the gear ratio between the stationary gear 131 and vane gears 141, 142, 143 and 144 is one to one so that the vanes make one complete rotation for each rotation about the center of the rotor, and thus always present the same face to a fixed point on the casing. If desired, the idler gears may be located off the center line of the sun and planet gears, whereby a larger idler gear may be employed. If desired, the shafts 116, etc. may be splined as indicated at 147 (Figure 19) with an incommensurable number of splines with respect to the teeth of the planet gears 148 which are splined at 149 so that by turning the planet gear to a new position the rotary vane may be properly timed to pass the division plate without interference.

The space 146 between the rotor 75 and the wall or cylindrical bore 4 constitutes the measuring chamber, and as shown in Figure 3, when any one of the recesses 76, 77, 78, or 79 are directly opposite the division plate 18, the division plate spans the cylindrical recess in the rotor with a small amount of overlap to separate the inlet and outlet. Although the rotary vane will shift its position as it passes the division plate, the vane is set back enough from the periphery of the rotor so that as the vanes make this slight rotation in passing across the division plate the division plate does not interfere in any way therewith. Fluid trapped in the cylindrical pocket between the rotary vane and division plate may wash around the vane without causing hydraulic lock.

As shown in Figure 2, the inlet and outlet pipe connections of the meter are in alignment, and the channels through the meter casing therefor are crossed to allow the liquid to enter from one side, pass through the meter and discharge from the other side in alignment. When the meter is in service in the position shown in Figure 2, any foreign material that enters the measuring chamber is carried around to the outlet and is discharged therefrom. Referring to Figures 2 and 12 to 18, the inlet pipe 151 has a flange 152 adapted to abut the machined face 153 of the rotor casing. The face 153 has bosses with threaded holes 154 therein, and bolts 155 pass through holes 156 in the flange 152 into the threaded holes 154 to hold the inlet pipe and meter in assembled relation. The inlet pipe is divided diagonally by a web 157 which merges with the longitudinal partition 158. The longitudinal partition 158 in assembled position registers with the horizontal partition 9 in the meter casing. Thus, it will be seen that fluid entering from the inlet side of the pipe 159 is deflected by the diagonal wall 157 to the opening 160 in the flange 152 and enters the meter through the inlet 7, and after passing through the meter discharges through the outlet 8 and port 160a and is deflected by the diagonal wall 157 into the outlet side 161 of the pipe connection.

The operation of the meter now will be described. Fluid enters through the inlet pipe 159 and is deflected by the diagonal wall 157 and longitudinal wall 158 into the inlet port 160 of the manifold and by inlet 7 of the casing into the measuring chamber 146 substantially tangential to the rotor, the fluid pressure and velocity engaging the vane 122 and causing the rotor 92 to rotate. As seen in Figure 3, the rotor will rotate in clockwise direction, and the fixed gear 131, idler gears 135, and vane gears 141, 142, 143 and 144 will rotate the vanes counter-clockwise on their own respective axes. As seen in Figure 3, the vane 122 provides a seal with the fixed wall of the meter chamber, and vanes 123 and 124 also provide a seal, the vane 124 being just ready to rotate out of sealing engagement with the meter chamber wall. The vane 121 is disposed across the division plate 18 and the division plate engages the cylindrical faces 88 and 92 of the rotor with a slight clearance and prevents fluid from bypassing from the inlet to the outlet. The fluid trapped between the vane 121 and division plate 18 can freely wash around the vane and thus does not cause hydraulic lock. During rotation of the rotor fluid flows around the measuring chamber 146 and is discharged through the outlet 21 and outlet port 8, past the dividing webs 9 and 158 and port 160a, and is deflected by diagonal wall 157 into the discharge side 161 of the manifold. The meter herein disclosed may be made of any suitable length with the vanes extending the full length of the rotor, as the vanes have end bearings and the division plate is secured in abutting relation to the fixed meter wall.

It will be understood that various modifications may be made within the scope of the invention without departing from the essentials thereof. In place of the gears any other suitable mechanism may be employed to rotate the vanes in the desired ratio with respect to the rotor as the rotor rotates. However, I prefer to use means employing non-reversing or non-reciprocating motions in order to eliminate vibration of the meter.

What is claimed and desired to be secured by United States Letters Patent is:

1. In a fluid meter, a casing having a cylindrical bore therein forming a fixed wall of a metering chamber, fluid inlet and outlet connections for said chamber, a fixed bearing plate in said casing, a shaft located in said bearing plate coaxially of the casing, a rotor mounted to rotate about the axis of said shaft and having a plurality of recesses in the surface thereof, said plate having a portion overlying said metering chamber and having a running clearance with the rotor, a plurality of semi-cylindrical vanes journalled in said recesses, said vanes being of such diameter as to provide a running clearance with the fixed wall of the casing, and a division plate located between the inlet and the outlet in the measuring chamber and providing a running clearance with the rotor.

2. In a fluid meter, a casing having a cylindrical bore therein, inlet and outlet connections in said casing, and a shaft journalled concentrically of said bore, a rotor secured to said shaft to rotate therewith, said rotor having a plurality of recesses in its periphery, end plates secured to said rotor, a plurality of semi-cylindrical vanes in said recesses journalled in said end plates, fixed end plates having flanges overlying the space between the rotor and casing and having a running clearance with said rotor plates, and means for rotating said vanes as the rotor rotates.

3. In a fluid meter, a casing having a cylindrical bore therein forming a fixed wall of a metering chamber, fluid inlet and outlet connections in the casing, end bearing plates in said casing, ball bearing assemblies in said bearing plates, a shaft journalled in said ball bearing assemblies coaxially of the casing, a rotor secured to said shaft to rotate therewith and having a plurality of recesses in the surface thereof, there being a measuring chamber provided between the rotor and the fixed wall of the casing, a plurality of semi-cylindrical vanes journalled in said recesses, means to adjust the rotor axially to adjust the end clearance of the rotor and vanes, a division plate located between the inlet and the outlet in the measuring chamber and means for rotating said vanes as the rotor rotates.

4. A fluid meter comprising a casing having a cylindrical bore therein, the interior wall of which provides a non-rotatable wall of a measuring chamber, end plates defining the ends of the measuring chamber, inlet and outlet passages in the casing for said metering chamber, a division plate secured in abutting sealing relation to said non-rotatable wall for the full length of said chamber, a rotor located substantially concentrically of said bore and entirely on one side of said division plate, a plurality of recesses in the periphery of said rotor, said division plate separating the inlet and outlet passages and being of sufficient width to span a recess in the rotor, a plurality of semi-cylindrical vanes located in said recesses with a clearance on the order of several thousandths of an inch between the vanes and the cylindrical walls of the recesses, said vanes extending for the full length of the metering chamber and having tangential running contact with the fixed cylindrical wall of the metering chamber, and means for rotating said vanes as the rotor rotates.

5. In a fluid meter, a casing having a cylindrical bore therein, the interior wall of which provides a non-rotatable wall of a measuring chamber, inlet and outlet passages in the casing for said measuring chamber, a rotor located substantially concentrically of said bore and spaced from said non-rotatable wall to form a measuring chamber therewith, said rotor having substantially cylindrical recesses at its periphery, a plurality of semi-cylindrical vanes having shafts extending therefrom located in said recesses, a bearing plate at one end of said casing having a central hub, a gear secured to said hub, said shafts being splined and having gears thereon, the number of splines being incommensurable with respect to the teeth of said gears whereby the timing of said vanes may be accurately adjusted, and idler gears secured to said rotor and meshing with said central gear and vane gears.

6. In a fluid meter, a casing having a cylindrical bore therein forming a fixed cylindrical wall of a metering chamber, a cylindrical rotor located in said bore providing a fluid metering chamber therewith and having a plurality of recesses in the surface thereof, said casing having fixed end plates overlying said metering chamber and providing a running clearance with the rotor, a shaft rotatably journalled in said end plates and secured to the rotor to rotate therewith, a division plate secured to the casing running the full length of the metering chamber between the end plates and providing a running clearance with the rotor, said division plate being of greater arcuate extent than a recess, a plurality of semi-cylindrical vanes journalled in said recesses, said vanes being of such diameter to provide a running clearance with the fixed cylindrical wall of the casing, and of such length as to provide a running clearance with the end plates of the meter chamber, and means for uniformly rotating said vanes as the rotor rotates.

7. In a fluid meter, a casing having a cylindrical bore therein forming a fixed cylindrical wall of a metering chamber, a cylindrical rotor located in said bore and providing a fluid metering chamber therewith and having a plurality of recesses in the surface thereof, said casing having fixed end plates overlying said metering chamber and providing a running clearance with the rotor, a shaft rotatably journalled in said end plates and secured to the rotor to rotate therewith, a division plate secured to the casing running the full length of the metering chamber between the end plates and providing a running clearance with the rotor, said division plate being of greater arcuate extent than a recess, a plurality of semi-cylindrical vanes journalled in said recesses, said vanes being of such diameter to provide a running clearance with the fixed cylindrical wall of the casing, and of such length as to provide a running clearance with the end plates of the meter chamber, means to adjust the rotor and vanes axially to adjust the end clearance of the vanes with the end plates, means for rotating said vanes as the rotor rotates, and a register driven by said shaft to indicate the quantity of fluid passed through the metering chamber.

8. In a rotary meter, a casing having a cylindrical bore therein providing a non-rotatable wall of a metering chamber, fluid inlet and outlet connections, a rotor mounted in said casing having a plurality of substantially cylindrical recesses in its periphery, stationary end plates overlying said metering chamber and having a running clearance with the rotor, means separating the inlet and outlet running the full length of the rotor and having a clearance on the order of several thousandths of an inch therewith, a plurality of vanes in said recesses journalled in the rotor and having a clearance on the order of several thousandths of an inch with the non-rotatable wall of the metering chamber, and means for rotating said vanes as the rotor revolves.

9. In a fluid meter, a casing having a cylindrical bore therein forming a fixed cylindrical wall of a metering chamber and inlet and outlet openings in said casing communicating therewith, a cylindrical rotor located in said bore and providing a fluid metering chamber therewith and having a plurality of recesses in the surface thereof, said casing having fixed end plates overlying said metering chamber and providing a running clearance with the rotor, a shaft rotatably journalled in said end plates and secured to the rotor to rotate therewith, separating means running the full length of the metering chamber between the end plates between the inlet and outlet openings and providing a running clearance with the rotor, said means being of greater arcuate extent than a recess, a plurality of vanes journalled in said recesses, said vanes being of such diameter to provide a running clearance with the fixed cylindrical wall of the casing, and of such length as to provide a running clearance with the end plates of the meter chamber, means to adjust the rotor and vanes axially to adjust the end clearance of the vanes with the end plates, and means for rotating said vanes as the rotor rotates.

10. In a fluid meter, a casing having a cylindrical bore therein forming a fixed wall of a metering chamber, fluid inlet and outlet connections for said chamber, end walls for said chamber including a fixed bearing plate in said casing having a portion overlying said metering chamber and having a running clearance with the rotor, a shaft located in said bearing plate coaxially of the casing, a rotor mounted to rotate about the axis of said shaft and having a plurality of recesses in the surface thereof, a plurality of semi-cylindrical vanes in said recesses having a running clearance therewith, a division plate located between the inlet and the outlet in the measuring chamber and providing a running clearance with the rotor, and means to adjust the rotor axially to adjust the end clearance of the rotor and vanes.

11. In a fluid meter, a casing having a cylindrical bore therein, a rotor located substantially concentrically in said bore and spaced therefrom to form a measuring chamber, inlet and outlet passages in the casing for the measuring chamber, said rotor having substantially cylindrical recesses in its periphery, a plurality of vanes having shafts extending therefrom located in said recesses and journalled in said rotor, said shafts being splined and having gears thereon, the number of splines being incommensurable with respect to the teeth of said gears whereby the timing of said vanes may be accurately adjusted, idler gears meshing with said vane gears, and a sun gear meshing with said idler gears.

WALTER H. MARSH.